United States Patent
Vilas Boas et al.

(10) Patent No.: US 11,171,562 B1
(45) Date of Patent: Nov. 9, 2021

(54) MULTI-SENSE POINT VOLTAGE REGULATOR SYSTEMS AND POWER-REGULATED DEVICES CONTAINING THE SAME

(71) Applicant: NXP USA, Inc., Austin, TX (US)

(72) Inventors: Andre Luis Vilas Boas, Amparo (BR); Marcelo Fukui, Vinhedo (BR); Andre Gunther, San Jose, CA (US)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 16/922,926

(22) Filed: Jul. 7, 2020

(51) Int. Cl.
| G05F 1/10 | (2006.01) |
| G05F 1/565 | (2006.01) |
| G05F 3/02 | (2006.01) |
| H02M 1/00 | (2006.01) |
| H02M 3/07 | (2006.01) |
| H02M 3/156 | (2006.01) |

(52) U.S. Cl.
CPC .................................. H02M 3/156 (2013.01)

(58) Field of Classification Search
None
See application file for complete search history.

(56) References Cited

U.S. PATENT DOCUMENTS

| 5,448,155 A | 9/1995 | Jutras |
| 7,102,338 B2 | 9/2006 | Osburn et al. |
| 7,135,842 B2 | 11/2006 | Banerjee et al. |
| 7,242,172 B2 * | 7/2007 | Carlson ..................... G06F 1/26 323/272 |
| 7,339,357 B2 | 3/2008 | Lopata |
| 7,619,398 B2 | 11/2009 | Barrows et al. |
| 7,741,736 B2 * | 6/2010 | Clemo ..................... H02J 1/14 307/130 |
| 7,812,552 B2 | 10/2010 | Yang |
| 7,928,670 B2 | 4/2011 | Chen et al. |
| 8,018,170 B2 | 9/2011 | Chen et al. |
| 8,487,477 B2 * | 7/2013 | Heineman ............... H02J 1/001 307/82 |
| 9,030,176 B2 | 5/2015 | Onouchi et al. |
| 9,167,644 B2 | 10/2015 | Kunst et al. |
| 9,213,382 B2 * | 12/2015 | Paillet ...................... G06F 1/26 |
| 9,374,716 B2 | 6/2016 | Enescu et al. |
| 9,983,602 B2 | 5/2018 | Raja et al. |
| 10,033,270 B2 * | 7/2018 | Bulzacchelli ........... H02M 3/07 |
| 10,069,409 B2 | 9/2018 | Bulzacchelli et al. |
| 10,110,116 B1 * | 10/2018 | Berge ................... H03K 17/165 |
| 2010/0141159 A1 | 6/2010 | Shiu et al. |

\* cited by examiner

*Primary Examiner* — Kenneth B Wells

(57) ABSTRACT

Multi-sense point voltage regulator systems are provided for usage in conjunction with power-regulated devices, such as system-on-chip and microcontroller unit devices. In embodiments, the multi-sense point voltage regulator system includes a multiplexer selector circuit and a voltage regulator. The multiplexer selector circuit is configured to: (i) monitor a local voltages at multiple sense points within an integrated circuit (IC) die circuit structure; and (ii) generate a feedback voltage indicative of a lowest one of the monitored local voltages. The voltage regulator is configured to generate a regulated power supply output voltage as a function of a differential between the feedback voltage and the reference voltage, with the regulated power supply output voltage provided to the IC die circuit structure to drive operation thereof.

19 Claims, 4 Drawing Sheets

US 11,171,562 B1

MULTI-SENSE POINT VOLTAGE REGULATOR SYSTEMS AND POWER-REGULATED DEVICES CONTAINING THE SAME

TECHNICAL FIELD

Embodiments of the present disclosure relate generally to microelectronics and, more particularly, to power regulated devices containing multi-sense point voltage regulator systems.

BACKGROUND

Various processing devices are utilized in conjunction with voltage regulators, which provide a regulated power-supply voltage for driving the processing platform or logic architecture of the device. The processing platform may contain any number of integrated circuit (IC) processing regions, such as different cores providing analog and/or digital signal processing functions, memory structures, or different domains within a core, one or more of which may be power-gated. The process platform may be integrated into a given IC die by interconnecting various transistors or gates having a predetermined layout, such as a Sea-of-Gates (SoG) architecture. In certain instances, the voltage regulator may be located offboard the IC die into which the logic architecture is integrated. In other instances, the voltage regulator may be integrated into the IC die as is often the case when the processing device assumes the form of a microcontroller unit (MCU) or a system-on-chip (SoC) device. When properly designed, a voltage regulator supplies a regulated voltage output to the logic architecture of a given SoC, MCU, or other processing device to satisfy the varying current demands of the device. In many instances, the voltage regulator supplies a single regulated voltage output for concurrently powering all cores, regions, or domains of the logic architecture integrated into the IC die. Due, in part, to the provision of voltage regulators, modern MCU and SoC devices are capable of functioning at relatively low voltages of 0.8 volts or less in certain instances.

A BRIEF DESCRIPTION OF THE DRAWINGS

At least one example of the present invention will hereinafter be described in conjunction with the following figures, wherein like numerals denote like elements, and:

Figure 2:
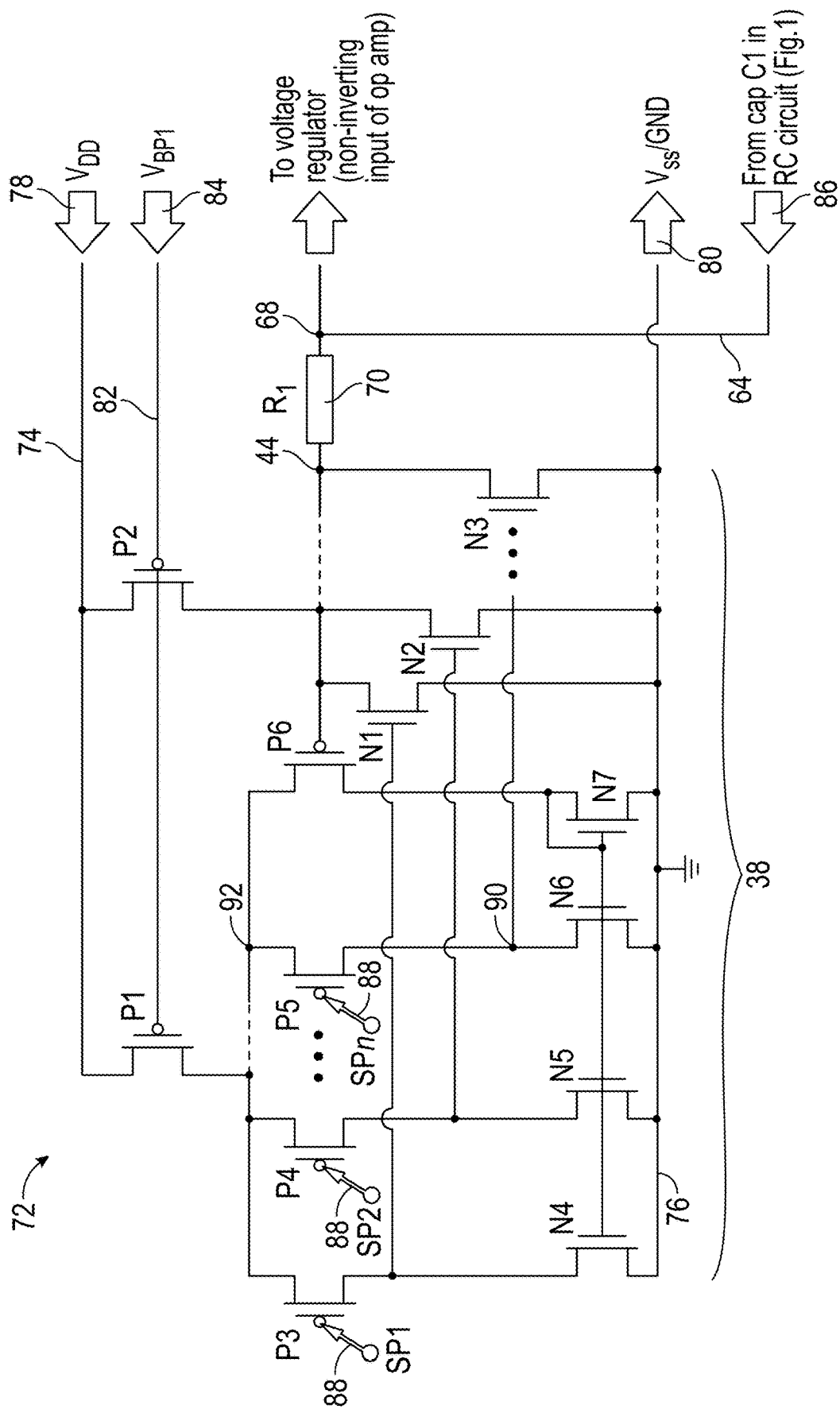
FIG. 2 is a schematic illustrating one manner in which the example smooth mux selector circuit of FIG. 1 can be implemented utilizing a complementary metal oxide semiconductor (CMOS) architecture in embodiments.
Figure 3:
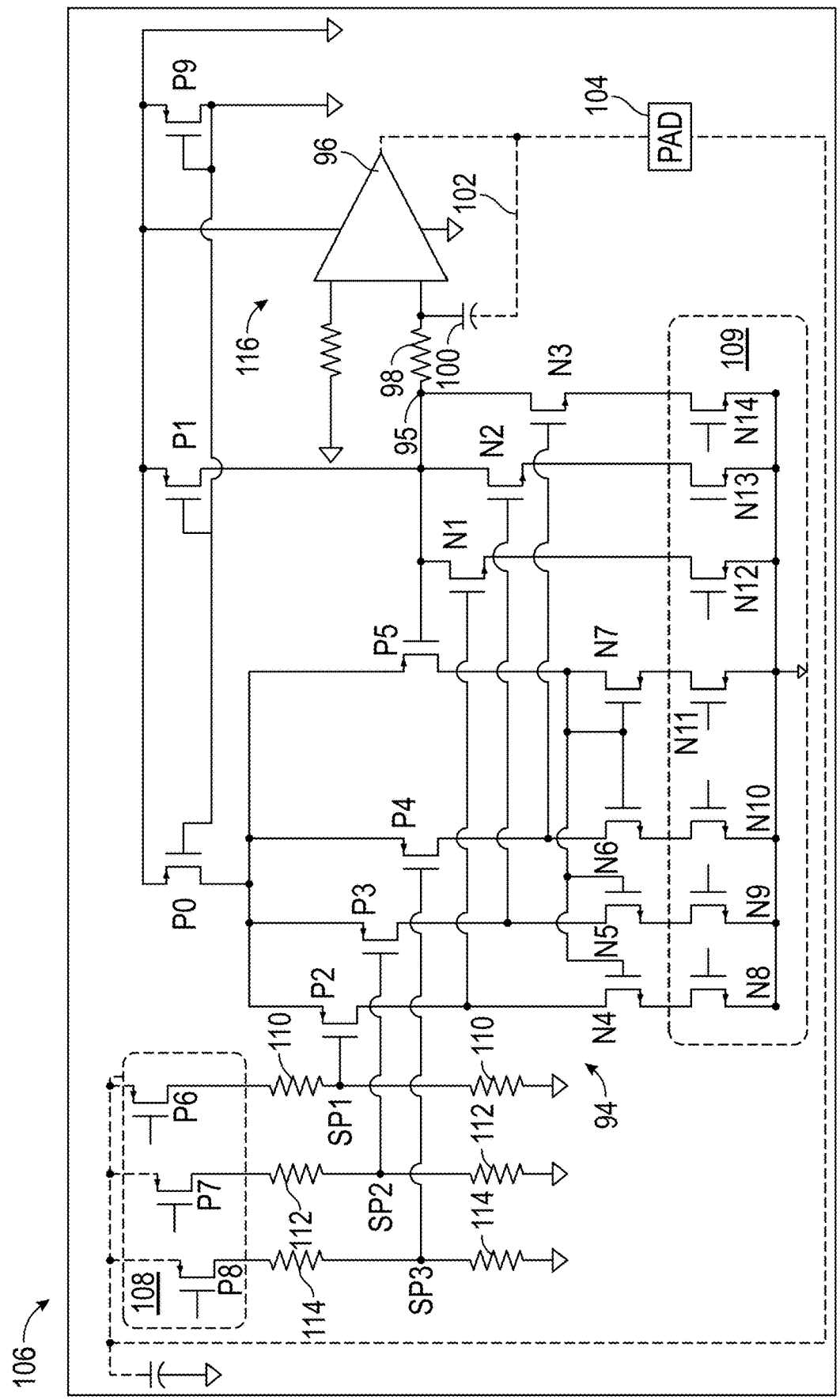
Figure 4:
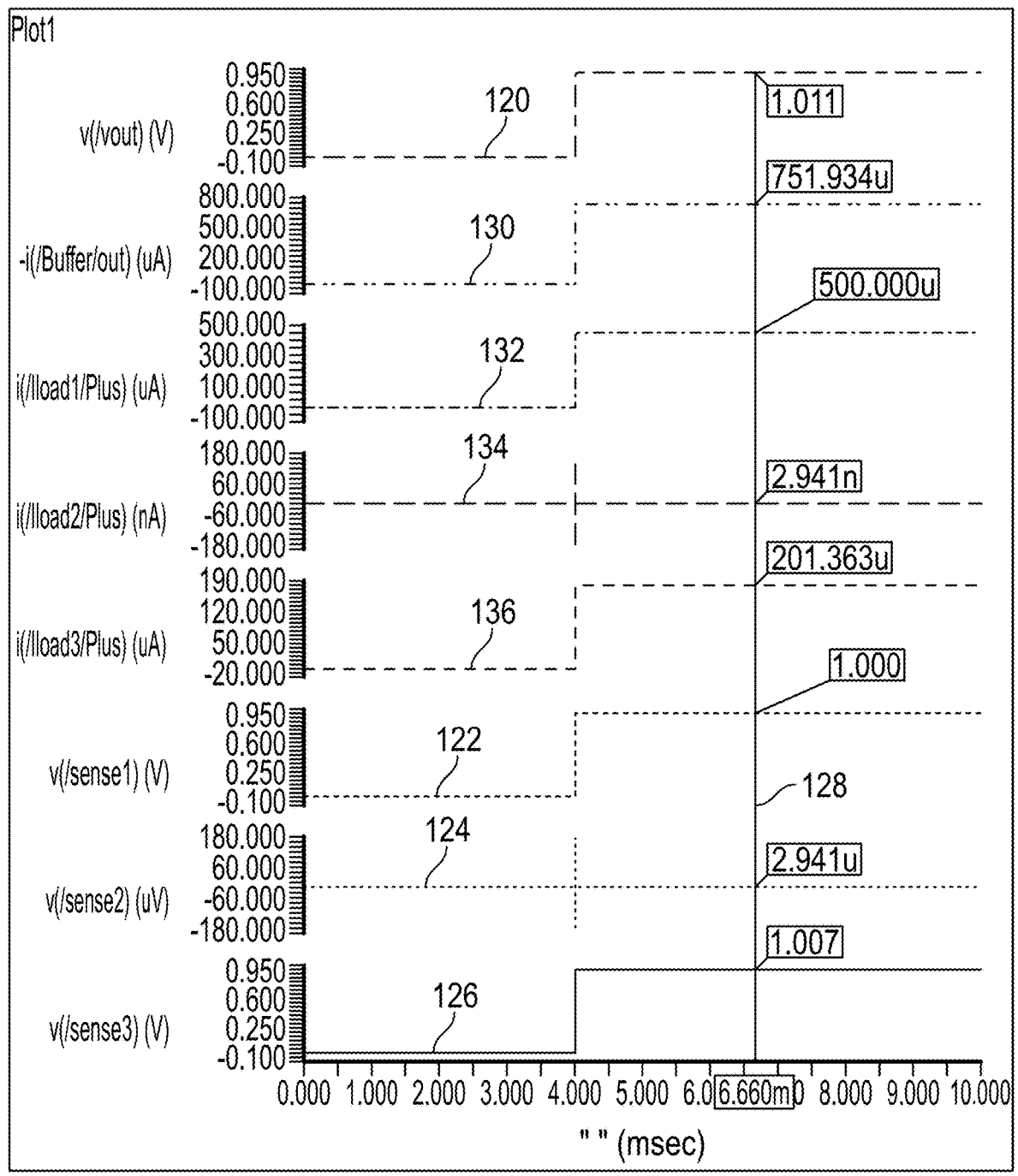

FIG. 3 is a schematic illustrating an example multi-sense point voltage regulator system containing a smooth mux selector circuit similar to that shown in FIG. 2, while modified to further include additional features accommodating one or more sense points located in power-gated logic regions of the power-regulated processing device; and FIG. 4 is a waveform plot illustrating an example scenario in which a multi-sense point voltage regulator system containing the smooth mux selector circuit shown in FIG. 3 provides a regulated output voltage corresponding to a lowest of a plurality of monitored voltages, while excluding any monitored voltages located in IC logic regions currently in a powered-down or low power state.

For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated. For example, the dimensions of certain elements or regions in the figures may be exaggerated relative to other elements or regions to improve understanding of embodiments of the invention.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

As previously discussed, power-regulated processing devices commonly contain linear voltage regulators, which convert an unregulated (or less regulated) power-supply voltage to a regulated power-supply voltage suitable for driving the processing platform of the processing device. In the case of microcontrollers unit (MCU), system-on-chip (SoC), and similar processing devices, the processing architecture may be implemented utilizing interconnected logic gate arrays integrated into a given integrated circuit (IC) chip or die, with the logic gate arrays having a Sea-of-Gates (SoG) architecture or another standardized topology. In this regard, the term "IC die logic architecture," as appearing herein, refers to the logic gate arrays integrated into a given IC die and interconnected to provide circuit functionality such as the processing, communication, sensing and/or memory storage functions of the device. The more general term "IC die circuit structure" is also utilized herein to describe any type of circuitry integrated into an IC die. A given IC die logic architecture can include any number of cores having analog processing, digital processing, and/or memory storage capabilities. Further, a circuit can be divided into multiple different regions or domains, one or more of which may be power-gated and, therefore, capable of operating in a powered-down or low power mode at certain junctures during device operation. In the case of many MCU and SoC processing devices, the voltage regulator is beneficially implemented as an internal or on-chip voltage regulator; that is, a voltage regulator integrated into the IC die bearing the logic architecture, which is powered by the regulated power-supply voltage. Additionally, in many instances, the voltage regulator may provide a single voltage-regulated power output, which is utilized to supply current across all regions, domains, or cores of the logic architecture carried by a particular IC die.

Traditional linear voltage regulator designs incorporate a differential amplifier and a power-dissipating device, which are typically provided as an operational amplifier and a pass transistor, respectively. A reference voltage is applied to the non-inverting input of the operational amplifier, while a negative feedback voltage is applied to the inverting input of the amplifier. The negative feedback voltage may be substantially equivalent to or otherwise indicative of a voltage measured at a fixed location (sense point) within a particular logic region of the die logic platform or architecture, such as a voltage measured within a core IC logic region of the processing device. The sense point is usefully located at a point in the IC logic region at which a voltage minimum often occurs during operation of the IC logic region (logic core) and, therefore, a point or location at which the largest voltage drops are frequently observed. Such a location is commonly referred to as a "hot point" of the IC die logic architecture. Notably, the voltage at the selected sense point location, and across the IC logic region generally, may fluctuate significantly during device operation due not only to the physical characteristics of the IC logic region(s) at issue, but also due to the dynamic activity of the logic. The operational amplifier, receiving a measured voltage minimum at the sense point, provides an output voltage corresponding to the differential (voltage drop) between the reference voltage applied to the non-inverting operational amplifier input and the present voltage minimum. The amplifier output voltage is applied to the gate of the pass transistor, thereby forming a closed feedback loop. The pass transistor is further biased to restrict current flow from the unregulated (or less regulated) power supply, as appropriate, to achieve the desired regulated output voltage generally satisfying the varying current demands of the IC die logic architecture.

The above-described scheme for regulating the power-supply voltage provided to an IC die logic architecture is limited in several respects. Such limitations arise, at least in part, from reliance on a single, fixed sense point in assessing the peak or maximum voltage drop across the entirety of the IC die logic architecture at any given juncture in time. While a carefully-chosen sense point location may reflect the lowest voltage within the IC die logic architecture with some frequency, many IC die logic architectures contain multiple locations that undergo significant voltage fluctuations in a highly dynamic, rapidly-changing manner during processing device operation. As a corollary, any single sense point is typically incapable of accurately indicating the lowest voltage within the IC die logic architecture at all, or perhaps most, points in time during processing device operation. Further, certain locations within the IC die logic architecture, which may otherwise be ideal candidates for locating such a solitary sense point, may be incompatible with this approach when such locations are contained within a power-gated region of the IC die logic architecture. If the sense point is located in an IC logic region that is power-gated and placed in a low power (or powered down) operational state, while a second IC logic region is operating in a full power state, the voltage measured at the sense point may be significantly greater than the lowest voltage within the IC die logic architecture at this moment in time. Consequently, at this point in time, the linear voltage regulator may provide insufficient output voltage to support proper IC logic operation; e.g., instances in which the IC logic contains a digital signal processing (DSP) region, the DSP region may be underpowered when operating in full power mode with a high clock speed.

An ongoing demand thus exists for improved voltage regulator systems overcoming the above-described limitations associated with single sense point voltage regulators. In particular, there exists an ongoing demand for multi-sense point voltage regulator systems capable of concurrently monitoring multiple sense points within a given IC die logic architecture (or other IC structure integrated into a die), reliably identifying the lowest voltage appearing at any one of the monitored sense points at any given point in time, and then generating a regulated output voltage based upon the lowest detected voltage (and, therefore, the maximum detected voltage drop) within the die logic architecture at this point in time. Ideally, such a multi-sense point voltage regulator system would further be capable of monitoring local voltages within IC logic regions, which are power-gated and periodically placed in powered-down or low power states during processing device operation. Embodiments of such multi-sense point voltage regulator systems are described herein, as are power-regulated devices (e.g., processing devices, such as SoC and MCU devices) containing such multi-sense point voltage regulator systems.

Certain multi-sense point voltage regulator systems have been recently proposed, which rely upon comparator-switch networks to isolate the lowest sensed voltage at a given point in time. While representing an improvement over conventional single sense point voltage regulators, such proposed multi-sense point voltage regulator systems remain limited due, at least in part, to instabilities and feedback loop interruptions resulting from the relatively abrupt manner in which comparator-switch networks inherently operate. Additionally, comparator-switch networks tend to require relatively high comparator-to-sense point ratios and may have power demands poorly suited for ultra-low power (sub-1 volt) applications, precluding usage of such networks in many modern MCU and SoC devices. Comparatively, at least some embodiments of the multi-sense point voltage regulator systems presented herein avoid reliance (or at least reduce reliance) on comparator-switch networks and, instead, incorporate a unique multiplexer selector circuit. The multiplexer selector circuit provides relatively seamless transitions when switching or shifting between the application of different sensed voltages to the input of a voltage regulator; e.g., the non-inverting input of an operational amplifier. To emphasize the relatively seamless sense point switching behavior of the selector circuit, the multiplexer selector circuit is referred to herein as a "smooth mux selector circuit." Embodiments of the below-described smooth mux selector circuit are amenable to implementation in a relatively straightforward manner utilizing various transistor technologies and complementary metal oxide semiconductor (CMOS) architectures. As a further advantage, embodiments of the multi-sense point voltage regulator system may have relatively low power demands and may thus be well-suited for integration into low power processing devices, such as low power MCU and SoC devices. In at least some embodiments, the multi-sense point regulator includes a resistor-capacitor (RC) circuit providing a low impedance feedback loop during load transients, which further promotes stability at certain (e.g., higher) operational frequencies. Finally, as noted briefly above and as discussed more fully below, embodiments of the multi-sense point voltage regulator system may include features (e.g., interconnected PMOS and NMOS switch arrays readily implemented in CMOS architectures) allowing the insertion of one or more sense points into power-gated IC logic regions without detracting from proper operation of the voltage regulator system.

Example embodiments of multi-sense point voltage regulator systems, as incorporated into a power-regulated device (e.g., an SoC device, an MCU device, or another power-regulated processing device), will now be discussed in connection with FIG. 1. Further, examples of manners in which the multi-sense point voltage system may be implemented utilizing CMOS architectures are set-forth below in connection with FIGS. 2-4. The following description is presented by way of non-limiting example only, emphasizing that further embodiments of the below-described multi-sense point voltage regulator system can differ in various respects without departing from the scope of the present disclosure set-forth in the appended Claims. For example, while described below as implemented utilizing a particular transistor type (namely, metal oxide semiconductor (MOS) field effect transistors (FETs) or "MOSFETs"), embodiments of the present disclosure can be implemented utilizing other transistor types (e.g., bipolar transistors), as well as different regulator build schemes including direct current-direct current (DCDC) and PMOS low drop output (LDO) architectures. Moreover, while the term "metal oxide semiconductor" or "MOS" is utilized herein by industry convention, it will be appreciated that the materials from which the below-described transistors are fabricated can vary such that conductive gate features are not required to be composed of metallic materials in all instances, nor is the gate insulator of a given transistor required to be composed of silicon oxide or another oxide in all instances. Rather, any combination of materials suitable for fabricating FETs, bipolar transistors, or another transistor type by processing of semiconductor-containing dies can be employed to produce embodiments of the present disclosure. Finally, while example embodiments of the present disclosure are described below in connection with a power-regulated processing device, such as an SoC or MCU device, further embodiments of the present disclosure can be implemented on or in conjunction with any IC die.

Figure 1:
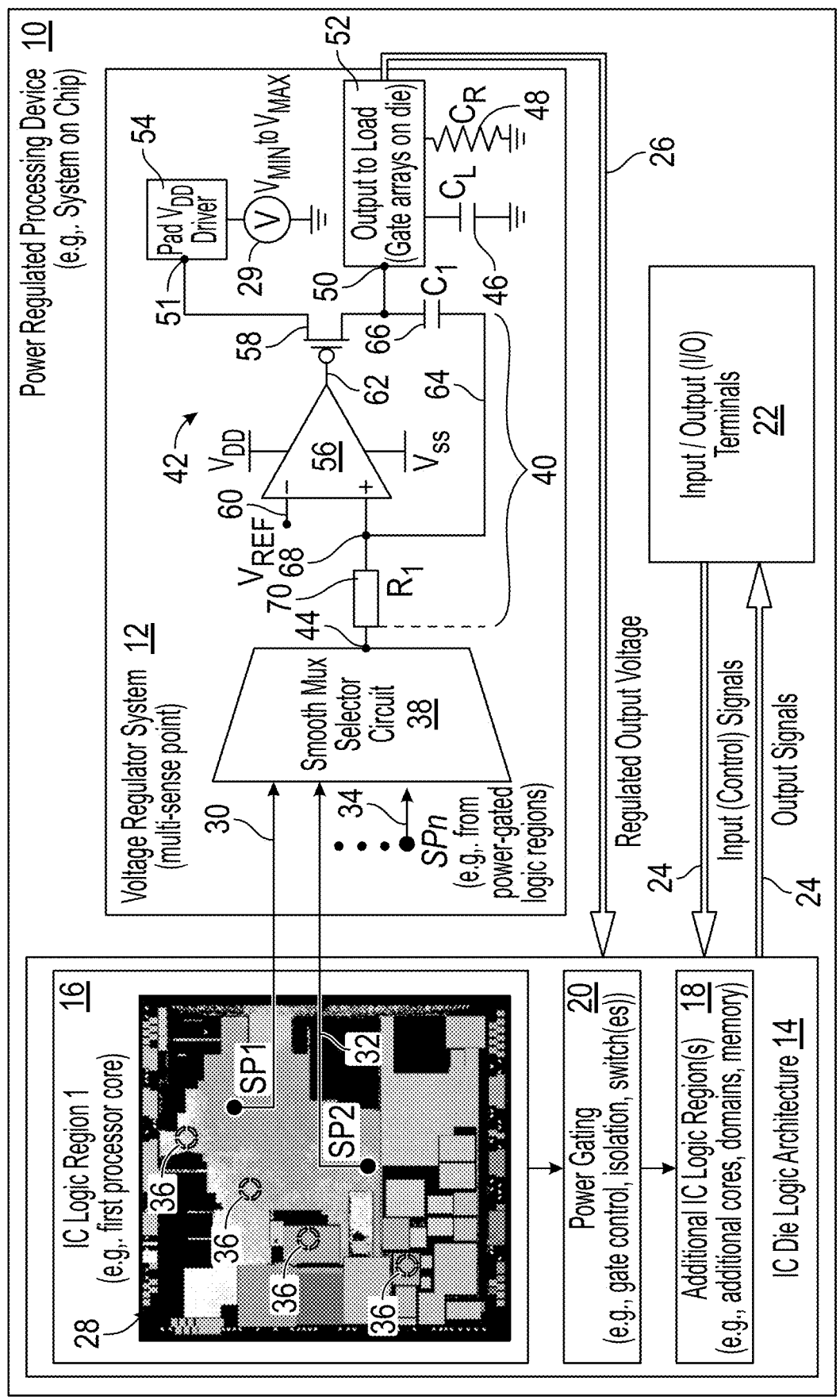
FIG. 1 is schematic of a power-regulated (e.g., processing) device containing a multi-sense point voltage regulator system, which includes (among other features) a smooth multiplexer (mux) selector circuit and an associated RC circuit, as illustrated in accordance with an example embodiment of the present disclosure.

Example of a Power-Regulated Device Containing a Multi-Sense Point Voltage Regulation System Referring to FIG. 1, a power-regulated device 10 contains a multi-sense point voltage regulator system 12, as depicted in accordance with an example embodiment of the present disclosure. In this particular example, power-regulated device 10 is a processing device and is referred to more fully as "power-regulated processing device 10" hereafter; it is emphasized, however, that embodiments of the present disclosure are not limited to usage in conjunction with processing devices, but can be applied to any power-regulated device implemented utilizing one or more ICs. In addition to multi-sense point voltage regulator system 12, power-regulated processing device 10 includes one or more IC logic regions 16, 18 forming a die logic platform or architecture 14 (or, more generally, an IC die circuit structure) integrated into a particular IC die or chip. As shown in FIG. 1, IC logic regions 16, 18 may represent different cores, domains, or other distinct regions of die logic architecture 14 dedicated to providing analog processing, digital processing, or memory storage functions. For example, in embodiments, IC logic region 16 may represent a first processing core, while IC logic regions 18 represent one or more additional processing cores (e.g., a digital signal processing (DSP) core) and memory structures; e.g., flash memory, static random-access memory (SRAM), dynamic random-access memory (DRAM), or another memory structure. In at least some implementations, a power gating topology 20 may be integrated into IC logic architecture 14. When present, power gating topology 20 can include any combination of gate control features, isolation cells, header or footer switches, and other such features enabling certain IC logic regions 16, 18 to be selectively switched into a powered-down or low power operational mode, while other IC logic regions 16, 18 continue to operate at full power. The provision of power gating topology 20 thus favorably reduces the overall power requirements of processing device 10. IC logic regions 16, 18 may be produced utilizing an SoG topology or architecture in embodiments; however, other transistor or gate topologies can be utilized in further implementations.

Power-regulated processing device 10 further includes input/output (I/O) terminals 22, such as an externally-accessible pin, ball, or land array, which allow electrical interconnection of device 10 within a larger electronic assembly or system. When installed within such a larger electronic assembly or system, I/O terminals 22 permit signal exchange with processing device 10 and, specifically, with IC die logic architecture 14, as indicated by arrows 24 in a lower portion of FIG. 1. In embodiments, power-regulated processing device 10 may assume the form of an MCU or SoC processing device, which is embedded within a larger electronic system or assembly to perform a dedicated control function. In such embodiments, multi-sense point voltage regulator system 12 may be an internal, on-chip voltage regulator; that is, a voltage regulator integrated into the IC die carrying the IC logic region or regions (here, IC logic architecture 14) to which voltage regulator system 12 supplies a regulated output voltage, as indicated in FIG. 1 by arrow 26. In other implementations, multi-sense point voltage regulator system 12 may be external to the IC die bearing die logic architecture 14, and/or processing device 10 may not assume the form of an SoC or MCU processing device. In all such scenarios, multi-sense point voltage regulator system 12 receives an unregulated or less regulated input voltage from a suitable voltage source (schematically represented by symbol 29) and generates therefrom a regulated output voltage 26 for driving the logic activity of IC die logic architecture 14. The less regulated power-supply voltage provided by voltage source 29 may fluctuate from a minimum value ($V_{MIN}$) to a maximum value ($V_{MAX}$). By way of non-limiting example, $V_{MIN}$ may range from about 1 to about 1.4 volts (V), while $V_{MAX}$ ranges from about 1.6 to 2V in embodiments. Comparatively, the regulated output voltage generated by multi-sense point voltage regulator system 12 exceeds $V_{MIN}$ and may range from about 0.8V to about 1V in embodiments. In other instances, the regulated output voltage generated by multi-sense point voltage regulator system 12 may be greater than or less than the aforementioned range.

As appearing in the upper left of FIG. 1, a power analysis image 28 plots local voltage measurements at a sample time interval during operation of IC logic region 16. Power analysis image 28 thus represents, in essence, an example voltage distribution snapshot of IC logic region 16. Here, greyscale shading is utilized to represent areas of lower voltage measurements, with darker shades denoting lower measured voltages. As can be seen, several regions of power analysis image 28 appear darker in shade indicating lower measured voltages, which result from local logic activities or "hot spots" presently occurring within IC logic region 16. Notably, such regions experiencing greater voltage drops are spatially distributed across IC logic region 16 and can vary in a highly dynamic manner from one timepoint to the next during operation of power-regulated processing device 10. Consequently, the lowest voltages observed within IC logic region 16, and therefore the greatest voltage drops, vary from location to location with dynamic, quasi-random changes in logic activities. Further, the lowest voltage (and, therefore, the greatest voltage drop) within IC logic architecture 14 may occur within another active IC logic region 18, rather than in IC logic region 16, at any given juncture in time. It can thus be appreciated that the traditional approach of monitoring a local voltage occurring at a single, fixed location within IC logic region 16 (or, perhaps, within another IC logic region 18 of IC die logic architecture 14) will fail to provide an accurate indication of the lowest within die logic architecture 14 across all operational periods of logic architecture 14. Overcoming this issue, multi-sense point voltage regulator system 12 concurrently monitors voltages at multiple strategically-chosen locations or "sense points" across IC die logic architecture 14 during operation of processing device 10, with voltage regulator system 12 then utilizing the lowest voltage to generate the regulated output voltage 26 supplied across die logic architecture 14. In so doing, multi-sense point voltage regulator system 12 better ensures that an appropriate voltage is maintained to satisfy the current demands across IC die logic architecture 14 as such current demands vary over time.

With continued reference to FIG. 1, examples of two sense point locations (identified as "SP1" and "SP2") are presented at which multi-sense point voltage regulator system 12 may monitor local voltages within die logic architecture 14. Specifically, multi-sense point voltage regulator system 12 may monitor the local voltages at example sense points (SP1 and SP2) within IC logic region 16, as indicated in FIG. 1 by arrows 30, 32. Additionally, and as indicated by sense point n (SPn) and arrow 34, multi-sense point voltage regulator system 12 may further monitor any practical number of additional sense points within IC logic region 16 and/or within additional IC logic regions 18. As appearing in the term "sense point n" and the abbreviation "SPn," the variable n may range from 1 to 20 or more in embodiments. Examples of other possible sense point locations suitably monitored by multi-sense point voltage regulator system 12 are identified in FIG. 1 by markers 36. Generally, then, multi-sense point voltage regulator system 12 may be configured to monitor any number of sense points greater than 1. Further, the sense points monitored by multi-sense point voltage regulator system 12 may be spatially distributed across the area of any number IC logic regions, including any number of cores or domains contained within IC die logic architecture 14. Concurrently, multi-sense point voltage regulator system 12 may be capable of selectively excluding from consideration sense points at which low local voltages are detected due to powered-down or low power operation of the IC logic region or regions in which such sense point(s) are located. Accordingly, multi-sense point voltage regulator system 12 provides designers with an increased flexibility or freedom to locate one or more sense points within power-gated regions of die logic architecture 14, as further discussed below in connection with FIGS. 3 and 4.

In the illustrated example, multi-sense point voltage regulator system 12 includes at least three primary components or circuits: a smooth multiplexer selector circuit 38, an RC circuit 40, and a voltage regulator 42. During operation of multi-sense point voltage regulator system 12, smooth multiplexer selector circuit 38 (hereafter "smooth mux selector circuit 38") receives a plurality of sensed voltages from multiple sense points and generates an output voltage at output node 44 indicative of the lowest measured voltage across the monitored sense points (SP1, SP2 . . . SPn). The output voltage generated by smooth mux selector circuit 38 is thus indicative or representative of the maximum measured voltage drop within die logic architecture 14 at a given juncture in time. As indicated above, mux selector circuit 38 is referred to as a "smooth" mux circuit to denote that, as the location at which the lowest measured voltage changes between sense points, the output voltage appearing at node 44 of smooth mux selector circuit 38 varies correspondingly in a relatively seamless or continuous (non-stepped) manner. In contrast, comparator-switch networks of the type described above typically provide more abrupt, discrete steps in voltage output in conjunction with transitions in the location at which the lowest voltage is detected at one of a plurality of sense points. Through such smooth or seamless transitions in voltage output, multi-sense point voltage regulator system 12 may improve the overall stability of die logic architecture 14 and, therefore, enhance the performance of power-regulated processing device 10. As a further benefit, smooth mux selector circuit 38 is able to provide such functions, while realized utilizing a CMOS-based architecture having a relatively compact, low complexity design. Additional description of manners in which smooth mux selector circuit 38 may be implemented, in embodiments, is provided below in connection with FIGS. 2 and 3. First, however, voltage regulator system 12 is described in greater detail to establish an example context in which embodiments of smooth mux selector circuit 38 may be better understood.

Voltage regulator 42 can have any circuit construction suitable for generating a regulated output voltage, which is supplied to a load having a particular capacitance (denoted by capacitor symbol 46) and resistance (denoted by resistance symbol 48). Again, in the present embodiment, the driven load includes the logic gate arrays (IC logic regions 16, 18) of IC die logic architecture 14, with the current demands of die logic architecture 14 varying based on the logic activities occurring within IC logic regions 16, 18, temperature variations, and other such dynamic factors. The particular manner in which the output of voltage regulator 42, as appearing at an output node 50, is supplied to die logic architecture 14 is largely inconsequential to embodiments of the present disclosure. However, by way of example, voltage regulator system 12 may contain a low voltage driver pad 52, which is electrically connected to die logic architecture 14. This pad 52 may be referred to as the "$V_{DDLV}$ pad" in embodiments in which voltage regulator system 12 has a FET-based construction. Similarly, processing device 10 may further include a power supply input pad 54 for distributing the unregulated (or less regulated) power supply input voltage from voltage source 29, as applied to an input node 51 of voltage regulator system 12. As indicated in FIG. 1, pad 54 may be referred to as the "$V_{DD}$" pad driver in implementations in which multi-sense point voltage regulator system 12 is realized utilizing FETs, as described below, again emphasizing that other transistor types (e.g., bipolar transistors) can be employed in alternative embodiments of the present disclosure. In embodiments, pads 52, 54 may be realized as larger electrically-conductive (e.g., squares) of material (e.g., metal) connected to the appropriate I/O terminals 22 (e.g., pins) of processing device 10, combined with appropriate pad driver circuitry providing overvoltage protection and similar functions.

Voltage regulator 42 contains, as primary components, a differential amplifier and a pass device, which are realized utilizing an operational amplifier 56 and a pass transistor 58, respectively. In the illustrated schematic of FIG. 1, pass transistor 58 is depicted as a P-channel MOSFET or, more briefly, a "PMOS transistor" and is thus described as such below. Pass transistor 58 includes drain and source terminals, which are coupled to output node 50 and input node 51, respectively, of voltage regulator system 12. However, in other embodiments, pass transistor 58 may be implemented as an N-channel MOSFET (herein, a "NMOS transistor") coupled between input node 51 and output node 50 of voltage regulator system 12 in a reversed manner; that is, such that the source and drain contacts of the NMOS transistor are coupled to output node 50 and input node 51, respectively, of voltage regulator system 12. This statement also applies to various other N-channel or P-channel transistors described herein, noting that transistors of opposing channel types can be interchanged in many instances with corresponding changes to the transistor or gate interconnection scheme.

Operational amplifier 56 includes an inverting input to which a reference voltage is applied (indicated in FIG. 1 by symbol 60), a non-inverting input to which the output of smooth mux selector circuit 38 is applied, and an output 62 electrically coupled to the gate electrode of pass transistor 58. During operation, operational amplifier 56 generates an output voltage at amplifier output 62, which is determined by the voltage differential between the amplifier input terminals. Accordingly, the output voltage of operational amplifier 56 may be substantially equivalent to, or otherwise indicative of, the maximum voltage drop within IC die logic architecture 14 at a given juncture in time. In this regard, the amplifier output voltage is determined as a function of the reference voltage applied to the inverting input of amplifier 56 less the lowest measured voltage amongst the monitored sense points (SP1, SP2 . . . SPn), as identified by smooth mux selector circuit 38 and applied to the non-inverting input of amplifier 56. By applying the output of operational amplifier 56 to the gate of pass transistor 58, current flow from input node 51 of voltage regulator system 12 to output node of voltage regulator system 42 is controlled to dissipate excess power supply current in transistor 58. A regulated voltage power supply is therefore provided to IC die logic architecture 14, while accommodating fluctuations in current demands of die logic architecture 14. This, in turn, optimizes the power consumption of IC die logic architecture 14, while maintaining appropriate gate closure timing, as previously described.

RC circuit 40 provides a low impedance negative feedback loop 64 from output node 50 of voltage regulator system 12 to the non-inverting input of operational amplifier 56. As indicated on the right of FIG. 1, at least one capacitor 66 is positioned in negative feedback loop 64. Specifically, capacitor 66 has a first terminal coupled to output node 50 of voltage regulator system 12 and a second terminal coupled to a node 68, which is located in the electrical path between a resistor 70 and the non-inverting input of operational amplifier 56. Comparatively, resistor 70 has a first terminal coupled to output node 44 of smooth mux selector circuit 38 and a second terminal coupled to the non-inverting input of operational amplifier 56. The provision of RC circuit 40 may beneficially further enhance the stability of voltage regulator system 12. For example, at certain (e.g., higher) frequency ranges, storage and discharge by capacitor 66 is partially, if not largely determinative of the output of voltage regulator system 12 appearing at node 50. Conversely, at other (e.g., lower) frequencies, capacitor 66 is effectively open, allowing the output of voltage regulator to be determined by the output of smooth mux selector circuit 38 and, therefore, the maximum voltage drop detected within die logic architecture 14. The values of resistor 70 and capacitor 66 (identified as R1 and C1, respectively) may be selected to fine tune the frequency response of voltage regulator system 12 in embodiments. Generally, the capacitance value of capacitor 66 (C1) is selected to ensure that negative feedback loop 64 closes prior to operational amplifier 56 reaching its unity gain bandwidth. In certain instances, C1 may be on the order of a few picofarads (pF); e.g., C1 may range from about 10 to about 30 pF in embodiments. Comparatively, the resistance value of resistor 70 (R1) may be chosen to accommodate transmission delays given, for example, the potentially remote location of one or more sense points (SP1, SP2 . . . SPn) relative to voltage regulator system 12. R1 may be on the order of tens or hundreds of kilo-ohms (kΩ) in embodiments; and, in at least some implementations, may range from about 30 to about 500 kΩ in embodiments. In still other implementations, the values of C1 and R1 may differ relative to the example ranges set-forth above.

In the above-described manner, multi-sense point voltage regulator system 12 enables relatively smooth or seamless variations in output voltage appearing at output node 50, while taking into account the maximum detected voltage drops occurring within die logic architecture 14 at different operational periods. Such smooth or relatively continuous transitions in sense point selection may minimize disturbances applied to the input of regulator 42 and, specifically, applied to the non-inverting input of operational amplifier 56 in the illustrated embodiment. RC circuit 40 lends additional stability to the operation of voltage regulator system 12 and can be realized with the provision of a single resistor (resistor 70) and a capacitor (capacitor 66) in embodiments. Capacitor 66, connected between the output of regulator system 12 and the feedback input of operational amplifier 56, provides a low impedance path during load transients to maintain proper regulator operation during sense point adjustments or transitions. Further, smooth mux selector circuit 38 automatically identifies the lowest measured voltage across the monitored sense points (SP1, SP2 . . . SPn), with the lowest measured voltage predominately determinative of voltage output of mux selector circuit 38. In various implementations, the voltage output of smooth mux selector circuit 38 may be approximately equivalent to the lowest voltage received at the input end of smooth mux selector circuit 38 such that Vout≈min(Vin1, Vin2 . . . Vinn); however, the voltage output of smooth mux selector circuit 38 need not be precisely equivalent to the lowest input voltage in all instances due to, for example, the influence of any other sense points having voltages approaching the lowest voltage. Smooth mux selector circuit 38 can have various different designs or topologies for accomplishing these functions, as will now be described in conjunction with FIGS. 2 and 3.

Advancing to FIG. 2, an example circuit topology 72 for implementing smooth mux selector circuit 38 utilizing a CMOS architecture is shown, with reference numerals carried forward from FIG. 1 where appropriate. Circuit topology 72 is implemented between voltage rails 74, 76 appearing at the upper and lower portions of this drawing figure, respectively. Voltage rails 74, 76 include a power supply rail 74 to which a power-supply voltage (here, VDD) is applied, as indicated by arrow 78. Voltage rails 74, 76 further include a ground rail 76 (labeled as VSS or GND), which provides current return to electrical ground, as indicated by arrow 80. A bias signal line 82 is further provided for application of input stage bias voltage, as indicated by arrow 84. As indicated by arrow 86, resistor 70 and a portion of negative feedback loop 64 are also shown in FIG. 2. As indicated in the upper left of FIG. 2, six PMOS transistors are contained in example circuit topology 72 and labeled as P1 through P6. Similarly, seven NMOS transistors are further contained in circuit topology 72 and identified as N1 through N7 in the example of FIG. 2. When properly biased, the NMOS transistors (here, NMOS transistors N1-N7) provide decreased current flow or no current flow when lower voltages are applied to their respective gate terminals. The NMOS transistors N1-N7 (enhancement mode MOSFETs or e-MOSFETs) instead transition to an increasingly conductive state (in common parlance, "turn on harder") as the voltages applied to their respective gate terminals increase. Conversely, the PMOS transistors (here, PMOS transistors P1-P6) provide greater current flow with lower voltages applied to their respective gate terminals; noting, in particular, that sense points SP1, SP2 . . . SPn are directly connected to the gate contacts of PMOS transistors P3-P5 in the illustrated example, as indicated by symbols 88. Generally, then, smooth mux selector circuit 38 may be described as containing a plurality of transistors (here, PMOS transistors P3-P5), each having a control terminal (gate) directly connected to one of the plurality of monitored sense points (SP1, SP2 . . . SPn). As a result of this structural configuration, the sensed voltages may control current flow through PMOS transistors P3-P5, with the PMOS transistor P3-P5 to which lowest voltage is applied forming a buffer amplifier with other circuit elements included in circuit topology 72 in the manner described below.

Due to the manner in which the respective gate contacts of PMOS transistors P3-P5 are directly coupled to or connected to the multiple sense points SP1, SP2 . . . SPn distributed throughout IC die logic architecture 14 (FIG. 1), the PMOS transistor P3-P5 receiving the lowest input voltage (as applied to the transistor's gate terminal from the respective sense point) carries the input stage bias current applied to line 82 ($V_{BP1}$). For ease of description, the transistor with the lowest input voltage at a given juncture in time is referred to hereafter as the "current minimum sense point transistor." Further, as stated above, the current minimum sense point transistor (again, the PMOS transistor P3-P5 to which the lowest sensed voltage is applied from SP1, SP2 . . . SPn) forms a buffer amplifier with the other interconnected transistors to replicate the voltage sensed at smooth mux selector circuit 38 at node 44 and onto resistor 70. Further, NMOS transistors N4-N6 function as a current mirror, while the NMOS transistor N7 acts a diode-connected element (here, a diode-connected MOSFET having connected gate and drain terminals). Consider, for example, an example scenario in which PMOS transistor P5 is the current minimum sense point transistor due the application of a minimum voltage to the gate electrode of transistor P5 via SPn. In the illustrated embodiment, the source of the PMOS transistor P5 is connected to node 92, while the drain of PMOS transistor P5 is connected to node 90. The gate of NMOS transistor N3 is further connected to the output of PMOS transistor P5 via node 90, while the respective source terminals of PMOS transistors P5 and P6 are electrically coupled via node 92. Due to this circuit arrangement, PMOS transistor P5 will turn on slowly and begin to conduct as the voltage applied to the P5 gate terminal (SPn) gradually decreases. As PMOS transistor P5 begins conducting, the voltage appearing at node 90 will increase correspondingly. As the voltage at node 90 continues to increase, so too does the voltage applied to the gate of NMOS transistor N3 (an enhancement mode transistor), which begins conducting when the voltage applied to the gate transistor N3 becomes sufficiently high.

Continuing the example above, as NMOS transistor N3 begins conducting, the voltage appearing at node 44 drops proportionally. The voltage appearing at node 44 will thus generally equalize with the voltage at SPn (again, the lowest sense point in this example), noting that transistors P3 and P4 and, therefore, corresponding respective transistors N1 and N3 remain in a non-conducting (or weakly conducting) state at this juncture. Concurrently, a current mirror arrangement is provided to regulate current flow through currently-conducting transistor P5 and to ground rail 76, allowing the voltage appearing at node 44 (and, therefore, resistor 70) to equalize with the sensed voltage (SPn) applied to the gate electrode of transistor P5, as just described. Accordingly, the gate of PMOS transistor P6 is electrically connected to node 44 such that, when the voltage appearing at node 44 is sufficiently low, transistor P6 turns on and begins conducting. As transistor P6 transitions to a conductive on state, current flows through transistor P6 to the current mirror arrangement formed by NMOS transistors N4-N6 in addition to diode-connected transistor N7. The voltage appearing at the commonly connected gate electrodes of transistors N4-N6 varies accordingly, with transistors N4-N6 equally sized and having substantially equivalent turn on voltages (VGS). NMOS transistors N4-N6 begin conducting when the common voltage applied to the gates of transistors N4-N6 becomes sufficiently high. As a result, current flow across PMOS transistor P5 is sunk to ground rail 76, as is any current flow across transistors P3 and P4 in instances in which SP1, SP2 . . . SPn are substantially equivalent such that all of transistors P3-P5 are in varying states of conduction. The lower voltage appearing at node 44 (and, therefore, at node 68 on the opposing side of resistor 70) enables voltage regulator system 12 to deliver a higher current to the load, thus allowing the voltage at the lowest sense point to equalize the regulator reference voltage VREF applied to the regulator inverter input.

In the above-described manner, the combination of PMOS transistor P5, PMOS transistor P6, and NMOS transistor N3 form a buffer (unity gain) amplifier or voltage follower, ensuring that the voltage output of smooth mux selector circuit 38 is predominately, if not exclusively determined by the detected voltage applied to the gate electrode of PMOS transistor P5 as SPn. Concurrently, little to no current flows through PMOS transistors P3, P4 in the example scenario above. Thus, in this example scenario, the other branches of the circuit structure have relatively little, if any, impact on the voltage output of smooth mux selector circuit 38, providing that the voltages at SP1, SP2 are not substantially equivalent (e.g., slightly more than) the voltage SPn. In a similar manner, should the lowest voltage appear at SP1 at a given time interval, PMOS transistor P3 will become the current minimum sense point transistor and cooperate with PMOS transistor P6 and NMOS transistor N1 to form a buffer amplifier reproducing the minimum sensed voltage (SP1) onto mux selector circuit output node 44 and resistor 70 in an analogous manner. Finally, should the lowest voltage appear at SP2, PMOS transistor P4 will become the current minimum sense point transistor and cooperate with PMOS transistor P6 and NMOS transistor N5 to form a buffer amplifier replicating the sensed voltage (SP2) onto output node 44. The circuit structure shown in FIG. 2 may thus be described as a loser-takes-all circuit, which senses a plurality of voltages and outputs the lowest of the sensed voltages (or a voltage indicative of the lowest of the sensed voltages) at node 44.

There has thus been provided an example multi-sense point voltage regulator system including a smooth mux selector circuit (mux selector circuit 38 shown in FIGS. 1 and 2) capable of concurrently monitoring multiple sense points within a given IC die logic architecture; automatically identifying the lowest detected voltage amongst the sense points at any given juncture in time; and generating an optimal power-supply voltage utilizing the lowest detected voltage identified by the smooth mux selector circuit. Advantageously, the above-described smooth multiplexer selector circuit (mux selector circuit 38) provides relatively seamless transitions between the application of disparate sensed voltages to a voltage regulator. Further, the smooth mux selector circuit can be implemented in a relatively straightforward manner using various transistor technologies and CMOS architectures, with operation of the selector circuit having relatively low power requirements. Additionally, in the above-described example embodiment, the multi-sense point regulation system includes a resistor-capacitor circuit (RC circuit 40 shown in FIG. 1) providing a low impedance feedback loop during load transients to further promote stability at certain (e.g., higher) operational frequencies. As a further benefit, embodiments of the multi-sense point voltage regulator system may include features permitting insertion of one or more sense points into power-gated IC logic regions. Such features can be readily integrated into variations of circuit topology 72 (FIG. 2) through the addition of interconnected arrays of PMOS and NMOS switches electrically coupled across the transmission lines, which electrically connect the sense points to the control inputs (gate terminals) of the transistors in the smooth multiplexer selector circuit. Additional description in this latter regard will now be provided in connection with FIGS. 3 and 4.

FIG. 3 is a schematic illustrating an example smooth mux selector circuit 94 similar to smooth mux selector circuit 38 described above in connection with FIG. 2, while modified to further include certain features accommodating positioning of the sense points in power-gated IC logic regions of power-regulated processing device 10 (FIG. 1). In the illustrated example, smooth mux selector circuit 94 includes (in addition to the other transistors described below) six PMOS transistors P0-P5 and seven NMOS transistors N1-N7, which are interconnected and function in a manner substantially identical to that previously described in connection with smooth mux selector circuit 38; that is, such that the PMOS transistor P3-P5 connected to the sense point (SP1-3) having the lowest voltage at a given time interval cooperates with pertinent components to form a buffer amplifier, which then replicates the sensed voltage onto output node 95 for application to the non-inverting input of an operational amplifier 96. Also, as was previously the case, an RC circuit is formed by a resistor 98 and a capacitor 100 (analogous to resistor 70 and capacitor 66 in FIG. 1), with capacitor 100 positioned in a negative feedback loop 102 connecting the output of operational amplifier 96 to the non-inverting input of amplifier 96. The output of operational amplifier 96 is coupled to a pad 104 for distribution to the logic architectures powered by multi-sense point voltage regulator system 106 in which smooth mux selector circuit 94 is included. Accordingly, the foregoing statements regarding the operation of smooth mux selector circuit 38 and, more generally, circuit topology 72 (FIG. 1), are equally applicable to the circuit topology schematically shown in FIG. 3.

In contrast to smooth mux selector circuit 38 described above in conjunction with FIG. 2, smooth mux selector circuit 94 further includes: (i) three additional PMOS transistors P6-P8, as contained in an upper left area 108 of the illustrated circuit layout, (ii) a fourth additional PMOS transistor P9, as illustrated in an upper right region of the illustrated circuit layout, and (iii) seven additional NMOS transistors N8-N14, as contained in a lower central area 109 of the illustrated circuit layout. PMOS transistors P6-P8 serve as power gate switches, with each switch controlling power flow to a different region of the illustrated circuit structure. With the exception of NMOS transistor N11, NMOS transistors N8-10 and N12-14 are associated with PMOS transistors or switches P6-P8. Specifically, NMOS transistors N8, N12 are associated with the power region controlled via PMOS transistor P6. NMOS transistors N8, N12 are connected to terminals of NMOS transistor N1 and P3, which monitors sense point SP1. Sense point SP1 is electrically coupled between PMOS transistor P6 and ground/$V_{SS}$, with resistors 110 located on either side of SP1. Similarly, transistors N9, N13 are electrically connected to terminals of NMOS transistor N2 and PMOS transistor P4, which monitors sense point SP2. Sense point SP2 is electrically coupled between PMOS transistor P7 and ground/$V_{SS}$, with resistors 112 located on either side of SP2. Finally, transistors N10, N14 are connected to terminals of NMOS transistor N3 and PMOS transistor P5, which monitors sense point SP3. Sense point SP3 is coupled between PMOS transistor P8 and ground/$V_{SS}$, and between resistor pair 114.

By virtue of the above-described circuit layout, smooth mux selector circuit 94 provides the lowest monitored voltage to the non-inverting input of operational amplifier 96 (or, more generally, to the feedback input of a voltage regulator 116 in which amplifier 96 is included), while ignoring or excluding sensed low voltages located in any regions of the IC presently placed in a powered-down or low power state via PMOS transistors/switches P6-P8. Consider, in this regard, waveform plot 118 set-forth in FIG. 4 graphically illustrating an example scenario in which multi-sense point voltage regulator system 106 (FIG. 3) provides a regulated output voltage corresponding to a lowest of a plurality of monitored voltages, while excluding or ignoring monitored voltages located in IC logic regions currently in a powered-down state. In this example, uppermost trace 120 denotes the voltage output of multi-sense point voltage regulator system 106, while the lower three traces 122, 124, 126 denote the voltages sensed at sense points SP1, SP2, SP3, respectively. As can be seen, at a timepoint indicated by vertical line 128 (occurring at about 6.660 milliseconds in this example), the voltages appearing at sense points SP1, SP2, SP3 are 1.000V, 2.941 micro-volts ($\mu f$), and 1.007V, respectively. The lowest voltage value (SP2) occurs due to the inactivity of the logic region in which the second sense point is located, as indicated by the flat waveform of trace 124. As further indicated by trace 120, smooth mux selector circuit 94 and, more generally, multi-sense point voltage regulator system 106 (FIG. 3) has effectively ignored or excluded this lower voltage appearing at SP2 due to the activity of transistors P8, N9, and N13 and generated an output voltage substantially equivalent to the lower of SP1 and SP3, plus a small buffer value of approximately 0.011V in the illustrated example.

In the example scenario of FIG. 4, and as indicated above, the lowest sensed voltage in an active logic region occurs at a first sense point (SP1), as plotted by waveform trace 122. Correspondingly, the largest current load in this scenario (here, 500 microamps or $\mu A$) is plotted by a waveform trace 130 (labeled "$I_{LOAD1}$"), which plots the current applied to the logic region in which the first sense point is located. Thus, in the illustrated example, waveform trace 130 corresponds to the current supplied to the logic region of SP1 at which the largest voltage drop is presently occurring at the timepoint represented by vertical line 128. Comparatively, waveform traces 132, 134 labeled "$I_{LOAD2}$" and "$I_{LOAD3}$" in FIG. 4 plot the current supplied to the IC die logic regions in which SP2 and SP3 are located, respectively. As can be seen, each logic region hosting a sense point acts as an electrical load drawing its own current; here, 500 $\mu A$, 2.941 nanoamps, and 201.363 $\mu A$ for current loads $I_{LOAD1}$, $I_{LOAD2}$, and $I_{LOAD3}$, supplied to the logic regions in which first, second, and third sense points are located, respectively.

Further, voltage regulator system 12 provides a cumulative current output at timepoint 128 of 751.934 µA, as indicated by a waveform trace 128 entitled "$I_{BUFFER/OUT}$"; and the voltage regulator system provides a voltage output (trace 120) higher than the reference voltage ($V_{REF}$, 1.000V) applied to the inverting input of the operational amplifier, such as operational amplifier 56 shown in FIG. 1. The voltage plotted by trace 122 at timepoint 128 thus matches the value of the reference voltage ($V_{REF}$, 1.000V) as the first current load ($I_{LOAD1}$) exceeds the second and third current loads ($I_{LOAD2}$, $I_{LOAD3}$) in the illustrated example.

CONCLUSION

There has thus been provided multi-sense point voltage regulator systems capable of concurrently monitoring multiple sense points within a given IC die logic architecture or, more generally, within a given IC die circuit structure. Embodiments of the multi-sense point voltage regulator system further incorporate a multiplexer selector circuit providing relatively seamless transitions between the application of different sensed voltages to an input of a voltage regulator, such as the non-inverting input of an operational amplifier. The multiplexer selector circuit can be implemented in a relatively straightforward, low power manner using various transistor technologies and CMOS architectures in at least some implementations. Additionally, in embodiments, the multi-sense point regulator may include an RC circuit providing a low impedance feedback loop during load transients, which may further promote stability at higher operational frequencies. As a still further benefit, embodiments the multi-sense point voltage regulator system may include features (again, readily implemented in CMOS architectures) allowing insertion of one or more sense points into power-gated IC logic without detracting from proper operation of the voltage regulator system.

In embodiments, the multi-sense point voltage regulator system includes a multiplexer selector circuit and a voltage regulator. The multiplexer selector circuit includes, in turn: (i) a plurality of sense point inputs configured to receive local monitored voltages at multiple sense points located within an IC die logic architecture or other IC die circuit structure, and (ii) a multiplexer selector circuit output at which a feedback voltage is generated, the feedback voltage indicative of a lowest one of the local monitored voltages. The voltage regulator includes a first input coupled to the multiplexer selector circuit output and at which the feedback voltage is received, a second input at which a reference voltage is received, and a voltage regulator output configured to supply a regulated power supply voltage to the IC die circuit structure. The voltage regulator is configured to generate the regulated power supply voltage as a function of a differential between the feedback voltage and the reference voltage applied to the first and second inputs, respectively. Further, in certain embodiments, the voltage regulator includes an operational amplifier and a pass circuit. The operational amplifier has an inverting input at which a reference voltage is received, a non-inverting input at which the feedback voltage is received, and an amplifier output at which an amplifier output voltage is generated corresponding to the differential between the reference voltage and the feedback voltage. The pass circuit has a first input node coupled to the amplifier output, a second input node at which the power supply input voltage is received, and an output node through which the regulated power supply output voltage is provided to the IC die logic architecture. Additionally, in at least some implementations in which the multi-sense point voltage regulator includes an IC die bearing the IC die circuit structure, the multiplexer selector circuit and the voltage regulator are integrated into the IC die.

Embodiments of a voltage regulated (e.g., processing) device, such as a voltage regulated SoC or MCU device, are further provided. In embodiments, the voltage regulated device include an IC die circuit structure (e.g., an IC die logic architecture) and a multi-sense point voltage regulator system. The multi-sense point voltage regulator system includes, in turn, a multiplexer selector circuit and a voltage regulator. The multiplexer selector circuit is configured to monitor local voltages at multiple sense points within the IC die circuit structure and generate a voltage indicative of a lowest one of the monitored local voltages. The multiplexer selector circuit is configured to generate a regulated power supply output voltage as a function of a differential between the voltage and a reference voltage, the regulated power supply output voltage supplied to the IC die circuit structure. Further, in at least some implementations, the multi-sense point voltage regulator system and the IC die circuit structure are integrated into a common (the same) semiconductor die.

While at least one example embodiment has been presented in the foregoing Detailed Description, it should be appreciated that a vast number of variations exist. It should also be appreciated that the example embodiment or example embodiments are only examples, and are not intended to limit the scope, applicability, or configuration of the invention in any way. Rather, the foregoing Detailed Description will provide those skilled in the art with a convenient road map for implementing an example embodiment of the invention, it being understood that various changes may be made in the function and arrangement of elements described in an example embodiment without departing from the scope of the invention as set forth in the appended claims. Numerical identifiers, such as "first," "second," "third," and the like may have been used above in accordance with the order in which certain elements were introduced during the course of the foregoing Detailed Description. Such numerical identifiers may also be used in the subsequent Claims to indicate order of introduction in the Claims. Accordingly, such numerical identifiers may vary between the Detailed Description and the subsequent Claims to reflect differences in the order of introduction of elements.

What is claimed is:

1. A multi-sense point voltage regulator system utilized in conjunction with a voltage regulated device containing an integrated circuit (IC) die circuit structure, the multi-sense point voltage regulator system comprising:
   a multiplexer selector circuit, comprising:
      a plurality of sense point inputs configured to receive monitored voltages at multiple sense points located within the IC die circuit structure; and
      a multiplexer selector circuit output at which a first voltage is generated, the first voltage indicative of a lowest one of the monitored voltages; and
   a voltage regulator, comprising:
      a first input coupled to the multiplexer selector circuit output and at which the first voltage is received;
      a second input at which a reference voltage is received; and
      a voltage regulator output configured to supply thereto a regulated power supply voltage, the voltage regulator configured to generate the regulated power supply voltage as a function of a differential between the first voltage and the reference voltage applied to the first and second inputs, respectively;

wherein the IC die circuit structure comprises a power-gated region;

wherein at least a first sense point included in the multiple sense points is located in the power-gated region of the IC die circuit structure; and wherein the multiplexer selector circuit is further configured to exclude a monitored local voltage appearing at the first sense point in generating the first voltage when the power-gated region is placed in a powered-down or low power state.

2. The multi-sense point voltage regulator system of claim 1, wherein the multiplexer selector circuit comprises a first plurality of transistors having gate terminals, each of the gate terminals electrically connected to a different one of the multiple sense points within the IC die circuit structure.

3. The multi-sense point voltage regulator system of claim 2, wherein the first plurality of transistors has a first channel type;

wherein the multiplexer selector circuit comprises a second plurality of transistors having a second, opposing channel-type; and wherein the second plurality of transistors comprises a plurality of gate terminals, each gate terminal connected to an output terminal of the first plurality of transistors.

4. The multi-sense point voltage regulator system of claim 1, wherein the multiple sense points are spatially distributed across the IC die circuit structure.

5. The multi-sense point voltage regulator system of claim 1, further comprising an IC die bearing the IC die circuit structure, the multiplexer selector circuit and the voltage regulator integrated into the IC die.

6. The multi-sense point voltage regulator system of claim 1 wherein the voltage regulator comprises an operational amplifier, wherein the first input comprises a non-inverting input of the operational amplifier, and wherein the second input comprises an inverting input of the operational amplifier.

7. The multi-sense point voltage regulator system of claim 6, wherein the voltage regulator further comprises a pass circuit having a first input node coupled to an output of the operational amplifier, a second input node at which a power supply input voltage is received, and an output node through which the regulated power supply voltage is provided to circuitry of the IC die circuit structure.

8. The multi-sense point voltage regulator system of claim 6, further comprising:

a negative feedback loop coupling an output of the operational amplifier to the non-inverting input of the operational amplifier; and a capacitor positioned in the negative feedback loop.

9. The multi-sense point voltage regulator system of claim 8, further comprising a resistor coupled between an output of the multiplexer selector circuit and the non-inverting input of the operational amplifier, the resistor combining with the capacitor to form a resistor-capacitor circuit.

10. The multi-sense point voltage regulator system of claim 9, wherein the resistor has a resistor value between about 30 and about 500 kilo-ohms, while the capacitor has a capacitance value between about between about 10 and about 30 picofarads.

11. A multi-sense point voltage regulator system utilized in conjunction with a voltage regulated device containing an integrated circuit (IC) die circuit structure, the multi-sense point voltage regulator system comprising:

a multiplexer selector circuit, comprising:
a plurality of sense point inputs configured to receive monitored voltages at multiple sense points located within the IC die circuit structure; and
a multiplexer selector circuit output at which a first voltage is generated, the first voltage indicative of a lowest one of the monitored voltages; and a voltage regulator, comprising:
a first input coupled to the multiplexer selector circuit output and at which the first voltage is received;
a second input at which a reference voltage is received; and
a voltage regulator output configured to supply thereto a regulated power supply voltage, the voltage regulator configured to generate the regulated power supply voltage as a function of a differential between the first voltage and the reference voltage applied to the first and second inputs, respectively;

wherein the multiplexer selector circuit comprises a first plurality of transistors having gate terminals, each of the gate terminals electrically connected to a different one of the multiple sense points within the IC die circuit structure;

wherein the multiplexer selector circuit is configured such that, when the lowest one of the monitored voltages is applied to a first transistor included in the first plurality of transistors, the first transistor cooperates with a plurality of other interconnected transistors further included in the multiplexer selector circuit to form a buffer amplifier circuit substantially reproducing the lowest one of the monitored voltages at the multiplexer selector circuit output.

12. The multi-sense point voltage regulator system of claim 11, wherein the IC die circuit structure comprises a power-gated region;

wherein at least a first sense point included in the multiple sense points is located in the power-gated region of the IC die circuit structure; and wherein the multiplexer selector circuit is further configured to exclude a monitored local voltage appearing at the first sense point in generating the first voltage when the power-gated region is placed in a powered-down or low power state.

13. A multi-sense point voltage regulator system utilized in conjunction with a voltage regulated device containing an integrated circuit (IC) die circuit structure, the multi-sense point voltage regulator system comprising:

a multiplexer selector circuit, comprising:
a plurality of sense point inputs configured to receive monitored voltages at multiple sense points located within the IC die circuit structure; and
a multiplexer selector circuit output at which a first voltage is generated, the first voltage indicative of a lowest one of the monitored voltages; and a voltage regulator, comprising:
a first input coupled to the multiplexer selector circuit output and at which the first voltage is received;
a second input at which a reference voltage is received; and
a voltage regulator output configured to supply thereto a regulated power supply voltage, the voltage regulator configured to generate the regulated power supply voltage as a function of a differential between the first voltage and the reference voltage applied to the first and second inputs, respectively;

wherein the multiplexer selector circuit comprises a first plurality of transistors having gate terminals, each of the gate terminals electrically connected to a different one of the multiple sense points within the IC die circuit structure;

wherein the first plurality of transistors has a first channel type;

wherein the multiplexer selector circuit comprises a second plurality of transistors having a second, opposing channel-type; and wherein the second plurality of transistors comprises a plurality of gate terminals, each gate terminal connected to an output terminal of the first plurality of transistors;

wherein the multiplexer selector circuit further comprises a current mirror circuit arrangement electrically coupled between the output terminals of the first plurality of transistors and the gate terminals of the second plurality of transistors.

14. A voltage regulated device, comprising:
an integrated circuit (IC) die circuit structure; and
a multi-sense point voltage regulator system, comprising:
  a multiplexer selector circuit configured to:
    monitor local voltages at multiple sense points within the IC die circuit structure; and
    generate a first voltage indicative of a lowest one of the monitored local voltages; and
  a voltage regulator configured to generate a regulated power supply output voltage as a function of a differential between the first voltage and a reference voltage, the regulated power supply output voltage provided to the IC die circuit structure;
wherein the voltage regulator comprises:
  an operational amplifier having an inverting amplifier input at which a reference voltage is received, a non-inverting amplifier input at which the first voltage is received, and an amplifier output at which an amplifier output voltage is generated corresponding to the differential between the reference voltage and the first voltage; and
  a pass circuit having a first input node coupled to the amplifier output, a second input node at which the power supply input voltage is received, and an output node through which the regulated power supply output voltage is provided to the IC die circuit structure;
wherein the multiplexer selector circuit comprises:
  a first plurality of transistors of a first channel type and each having a gate terminal electrically connected to one of the multiple sense points; and
a second plurality of transistors of a second, opposing channel type and each having a gate terminal connected to an output terminal of one of the first plurality of transistors;

a current mirror circuit arrangement electrically coupled between the output terminals of the first plurality of transistors and the gate terminals of the second plurality of transistors.

15. The voltage regulated device of claim 14, wherein the multi-sense point voltage regulator system and the IC die circuit structure are integrated into a common die.

16. The voltage regulated device of claim 14, further comprising:
a negative feedback loop coupling an output of the operational amplifier to the non-inverting input of the operational amplifier; and
a capacitor positioned in the negative feedback loop.

17. The voltage regulated device of claim 16, further comprising a resistor coupled between an output of the multiplexer selector circuit and the non-inverting input of the operational amplifier, the resistor cooperating with the capacitor to form a resistor-capacitor circuit.

18. The voltage regulated device of claim 16, wherein the IC die circuit structure comprises a non-power gated IC logic region and a power gated IC logic region; and
wherein the multiple sense points comprise first and second sense points located in the non-power gated IC logic region and in the power gated IC logic region, respectively.

19. A voltage regulated device, comprising:
an integrated circuit (IC) die circuit structure; and
a multi-sense point voltage regulator system, comprising:
  a multiplexer selector circuit configured to:
    monitor local voltages at multiple sense points within the IC die circuit structure using a plurality of gates of a plurality of transistors of the multiplexer selector circuit with each gate of the plurality receiving an indication of a voltage of the monitored local voltages at the multiple sense points; and
    wherein when the lowest one of the monitored local voltages is applied to a first transistor of the plurality of transistors, the first transistor cooperates with a plurality of other interconnected transistors further included in the multiplexer selector circuit to form a buffer amplifier circuit substantially reproducing the lowest one of the monitored local voltages at the multiplexer selector circuit output;
  a voltage regulator configured to generate a regulated power supply output voltage as a function of a differential between the substantially reproduced lowest one of the monitored local voltages and a reference voltage, the regulated power supply output voltage provided to the IC die circuit structure.

* * * * *